United States Patent [19]
Lippa

[11] Patent Number: 5,965,844
[45] Date of Patent: Oct. 12, 1999

[54] MOUNTING PLATE AND COVER FOR TWO ELECTRICAL BOXES IN THE SAME HORIZONTAL PLANE AND METHOD FOR INSTALLATION

[76] Inventor: Jerome M. Lippa, 2131 High Point Rd., Forest Hill, Md. 21050

[21] Appl. No.: 08/940,312

[22] Filed: Sep. 30, 1997

[51] Int. Cl.[6] .................................................. H02G 3/04
[52] U.S. Cl. ............................ 174/49; 174/55; 174/58; 174/63; 220/3.3; 220/3.8; 248/205.1
[58] Field of Search .................... 174/49, 48, 55, 174/58, 63, 66; 248/205.1, 27.1, 906, 300; 220/3.3, 3.5, 3.6, 3.8, 3.9, 3.92, 3.94, 4.02

[56] References Cited

U.S. PATENT DOCUMENTS

| | | | |
|---|---|---|---|
| 1,722,430 | 7/1929 | Kelly | 220/3.3 |
| 2,506,212 | 5/1950 | Grohsgal | 174/53 |
| 3,146,298 | 8/1964 | Ceglia | 174/49 |
| 3,588,019 | 6/1971 | Cozeck | 248/228.6 |
| 3,596,860 | 8/1971 | MacKay | 248/547 |
| 3,780,209 | 12/1973 | Schuplin | 174/51 |
| 4,410,004 | 10/1983 | Kifer et al. | 137/360 |
| 4,603,789 | 8/1986 | Medlin, Sr. | 220/3.9 |
| 4,753,361 | 6/1988 | Medlin, Jr. | 220/3.6 |
| 5,025,944 | 6/1991 | Rodick | 220/3.9 |
| 5,263,676 | 11/1993 | Medlin, Jr. et al. | 248/300 |
| 5,450,974 | 9/1995 | Lippa | 220/3.9 |

FOREIGN PATENT DOCUMENTS

| | | | |
|---|---|---|---|
| 779143 | 2/1968 | Canada | 248/906 |
| 2083957 | 3/1982 | United Kingdom | 174/48 |
| 2230146 | 10/1990 | United Kingdom | 174/58 |

*Primary Examiner*—Kristine Kincaid
*Assistant Examiner*—Dhiru R Patel
*Attorney, Agent, or Firm*—Leonard Bloom

[57] ABSTRACT

A mounting plate and cover for a pair of spaced-apart electrical boxes. The mounting plate and cover has a pair of spaced-apart openings and a planar flange portion therebetween. At least one electrical box is fastened to one of the openings. The flange portion is secured to the front face of the wall stud with the at least one electrical box abutting the sidewall of the wall stud. The bottom edges of the openings in the mounting plate and cover are in the same horizontal plane. A method of installation is disclosed.

9 Claims, 7 Drawing Sheets

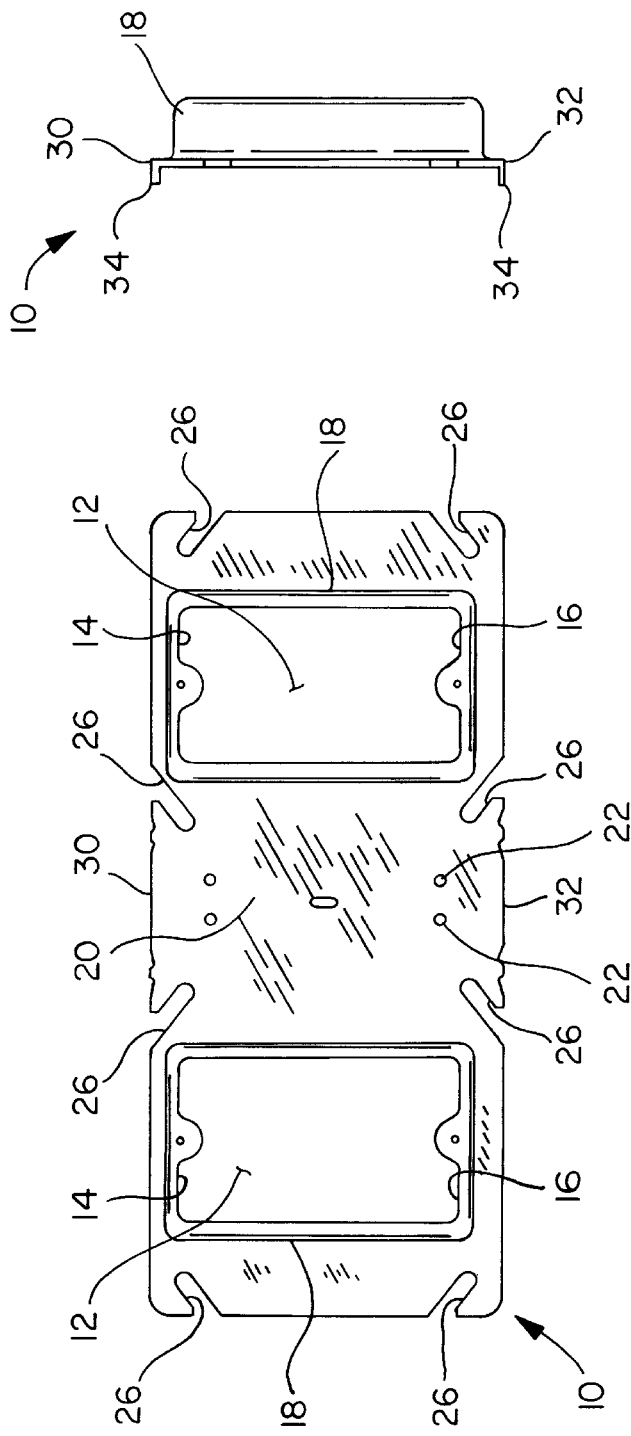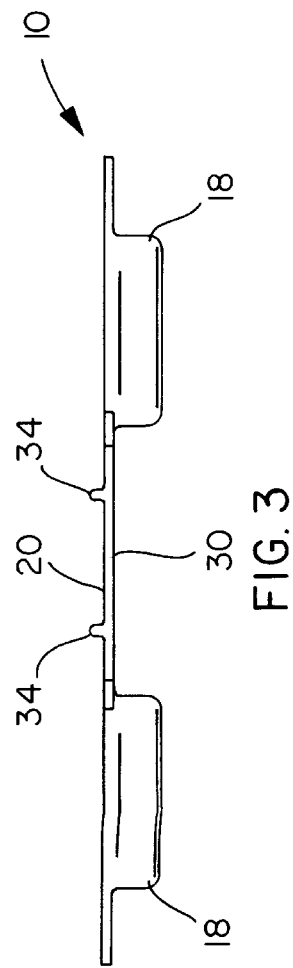

MOUNTING PLATE AND COVER FOR TWO ELECTRICAL BOXES IN THE SAME HORIZONTAL PLANE AND METHOD FOR INSTALLATION

FIELD OF THE INVENTION

The present invention relates to an apparatus and a method for installing at least one electrical outlet box on a stud and, more particularly to an apparatus having two openings for mounting the electrical outlet boxes straddling and abutting a wood or metal stud in a wall such that the electrical outlet boxes are aligned in the same horizontal plane.

BACKGROUND OF THE INVENTION

In the course of constructing or rehabilitating a building, there is a need to mount many electrical outlet boxes in the wall to provide a safe means for housing electrical fixtures such as electrical switches, convenience outlets, electrical terminals, telephone outlets, data terminals, etc. The electrical outlet boxes are commonly four (4) inch square boxes or four and eleven sixteenths (4 $^{11}/_{16}$) inch boxes. The electrical outlet box may be supported by a variety of methods. U.S. Pat. No. 5,450,974 to Lippa discloses a mounting plate and cover assembly for an electrical outlet box which permits the secure mounting of the electrical outlet box abutting a sidewall of a stud and preventing movement of the electrical outlet box. However, the assembly is for one outlet box and does not disclose the installation of two boxes in the same horizontal plane. There is a need for having two electrical boxes or one electrical box and a telephone/data outlet aligned in a horizontal plane and straddling a wall stud. This need has become more critical with the rapid expansion of computers and facsimile equipment where the telephone outlet or data outlet is most conveniently located in the immediate vicinity of a power source for the computer and/or facsimile device. It is difficult and time consuming to install the outlets on opposite sidewalls of a single wall stud at exactly the same height above the floor. U.S. Pat. No. 4,603,789 to Medlin, Sr. discloses mounting a pair of outlet boxes on a common stud but uses two separate boxes individually mounted. In all embodiments, the electrical outlet boxes do not abut the stud and require stiffening arms to support the electrical outlet boxes to a rear wall.

U.S. Pat. No. 4,753,361 to Medlin, Jr. discloses pairs of electrical switch boxes mounted on opposite sides of a single stud. The separate mounting brackets are abutting or "piggyback" and require separate installation. Furthermore, the brackets have stabilizing extension arms and the boxes do not abut the wall stud.

U.S. Pat. No. 5,025,944 to Rodick discloses two electrical receptacles spot welded to a connecting member. The connecting member is placed over the wall stud with the electrical receptacles adjacent to the side surfaces of the wall stud. A cover plate is required over the face of the receptacles.

It can be seen that there is a need for a simple, relatively inexpensive device to install electrical boxes abutting both sides of a wall stud so that the electrical boxes are in the same horizontal plane.

BRIEF SUMMARY OF THE INVENTION

It is an object of the present invention to provide an assembly which, when installed by the method disclosed, assures that two electrical boxes are mounted in the same horizontal plane and are abutting the opposite sidewalls of a wall stud.

It is a further object to provide an inexpensive assembly of two electrical boxes which can be easily installed on a wall stud so that movement of the electrical box in any direction is prevented.

In accordance with the teachings of the present invention, there is disclosed a method of installing a mounting plate and cover for two electrical boxes on a wall stud. The wall stud has a front face and two opposing sidewalls. A unitary member is provided having two spaced-apart openings formed therein. The openings each have a bottom edge, the bottom edges being in the same horizontal plane. The unitary member has means thereon to secure said unitary member to at least one electrical outlet box. The at least one outlet box communicates with at least one of the openings in the unitary member. A planar flange portion is formed between the spaced-apart openings. A plurality of spaced-apart holes are formed in the planar flange portion. The at least one electrical outlet box is secured to the unitary member. The planar flange portion is disposed over the face of the wall stud wherein the least one electrical outlet box abuts one of the sidewalls of the wall stud and the other opening in the planar member is disposed adjacent to the other sidewall of the wall stud. A plurality of fastening means are inserted into the corresponding plurality of spaced-apart holes in the planar flange portion to secure the mounting plate and cover to the front face of the wall stud. The at least one electrical box is prevented from undesired movement and the bottom edge of the spaced-apart openings are aligned in the same horizontal plane.

In another aspect of the present invention, there is disclosed a mounting plate and cover for a pair of spaced-apart electrical boxes. The mounting plate is mounted on a front face of a wall stud, the wall stud having two opposing sidewalls. The mounting plate is a unitary member having two spaced-apart openings formed therein. The openings each have a respective bottom edge, the bottom edges being in a same horizontal plane. The openings provide access to the electrical boxes. Means are provided on the unitary member for securing thereto at least one electrical outlet box to at least one of the openings. A planar flange portion is formed between the spaced-apart openings in the unitary member. A plurality of spaced-apart holes are formed in the planar flange portion. A corresponding plurality of fasteners are received in the plurality of holes to secure the mounting plate to the front face of the wall stud. In this manner, the mounting plate and cover may be securely mounted on the front face of the stud without undesired movement with the at least one electrical outlet box juxtapositioned to the sidewall of the stud and the bottom edges of the openings in a horizontal plane with respect to the stud.

These and other objects of the present invention will become apparent from a reading of the following specification taken in conjunction with the enclosed drawings.

BRIEF DESCRIPTION OF THE DRAWINGS

FIG. 1 is a front plan view of the mounting plate and cover of the present invention.

FIG. 2 is a side elevation view of the mounting plate and cover of FIG. 1.

FIG. 3 is a top plan view of the mounting plate and cover of FIG. 1.

DESCRIPTION

Figure 4:
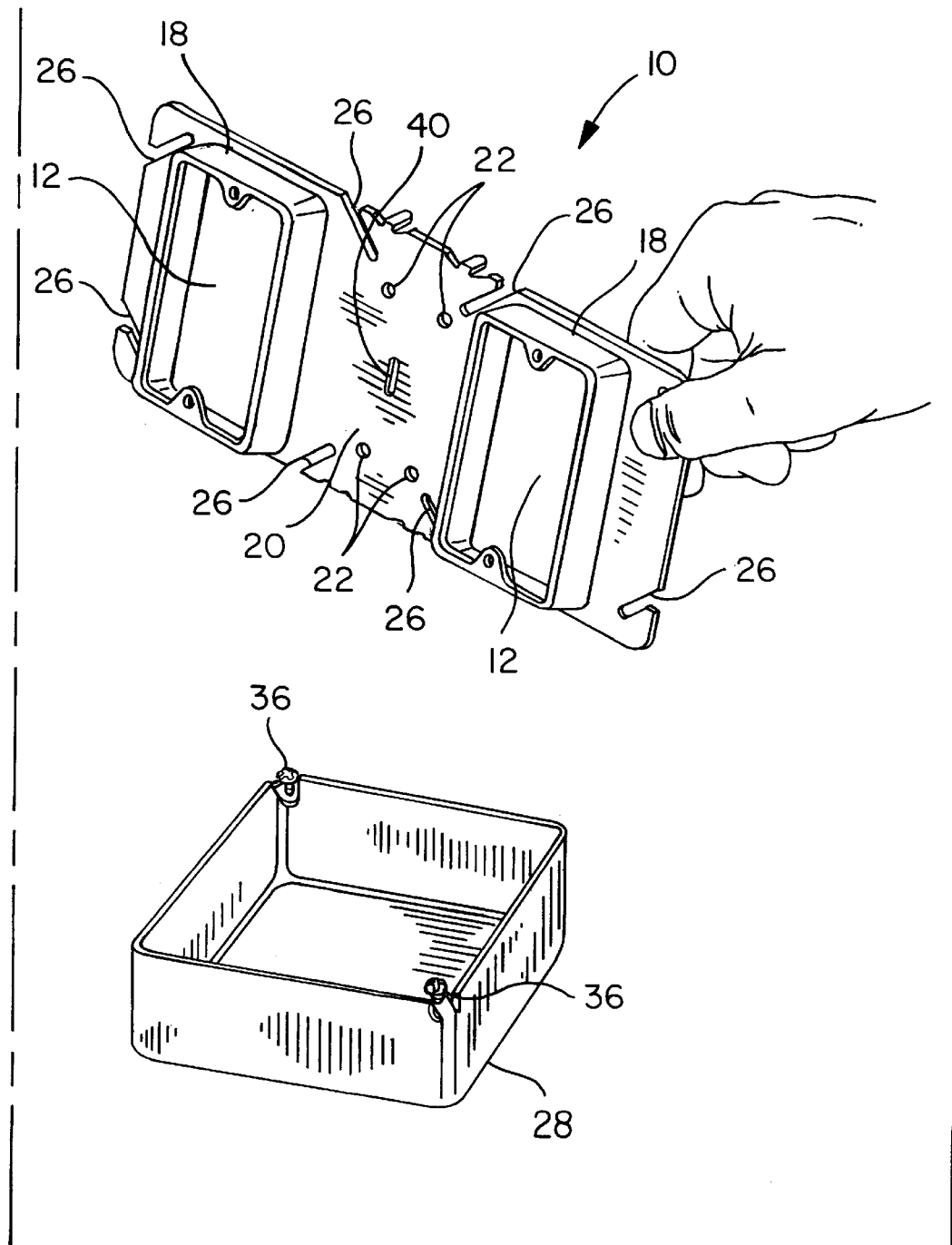
FIG. 4 is a pictorial view of a worker placing the mounting plate and cover of the present invention on an electrical box.

Referring now to FIGS. 1–3, the mounting plate and cover 10 of the present invention is a unitary member formed from a rigid material such as metal or plastic. A pair of spaced-apart openings 12 are formed in the unitary member 10. Each opening has a respective top edge 14 and bottom edge 16. A raised rib 18 is formed about the periphery of each opening 12. The rib 18 has a height which is approximately equal to the thickness of the wall W in which the outlet is to be mounted. A planar flange portion 20 is formed between the spaced-apart openings 12. A plurality of spaced-apart holes 22 are formed in the flange portion 20 for securing the mounting plate and cover 10 to a wall stud 24 as will be described. A pair of elongated openings 26 are formed on each side of the flange portion 20 adjacent to the rib 18 around each opening 12. A plurality of spaced-apart openings 26, preferably elongated, are formed in the edges of the unitary member 10. The elongated openings 26 are provided for adjustable connection of the unitary member 10 with an electrical box 28 as will be described.

The flange portion 20 has a top edge 30 and a bottom edge 32. A projecting tab 34 is formed on the top edge 30 and a similar projecting tab 34 is formed on the bottom edge 32 of the flange portion 20. The projecting tabs 34 are formed on the back surface of the flange portion 20 and are approximately perpendicular to the back surface. The projecting tabs 34 are in the same vertical plane and are inward of the elongated openings 26. Preferably, another pair of identical projecting tabs 34 are formed near the other opening 12 in the mounting plate and cover 10. The two vertical pairs of projecting tabs 34 are spaced apart by a distance which is sufficient to permit the respective pairs of projecting tabs 34 to straddle the wall stud 24.

Figure 5:
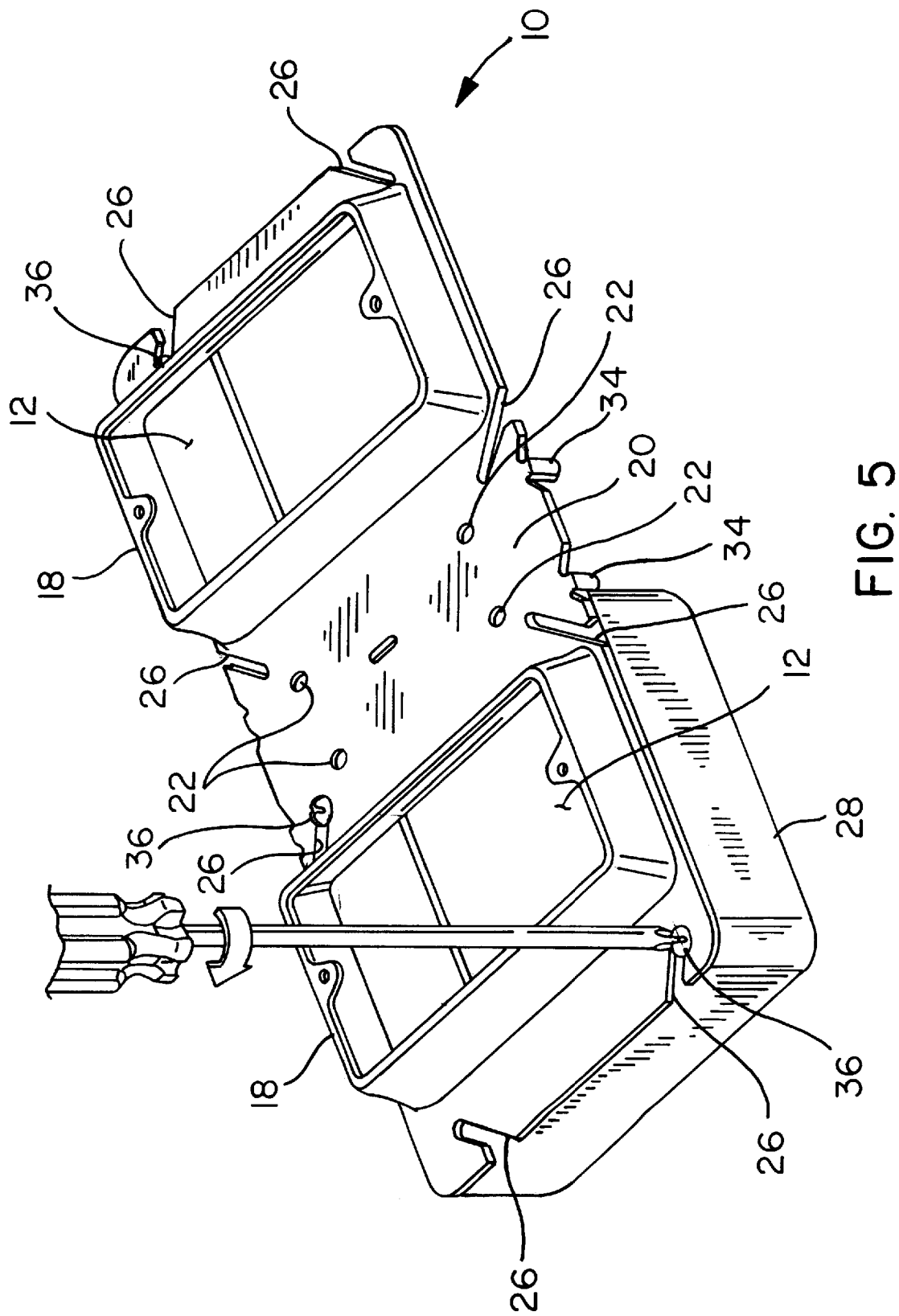
FIG. 5 is a pictorial view of the worker connecting the mounting plate and cover of the present invention to the electrical box of FIG. 4.

The electrical outlet box 28 contains therein at least one electrical fixture such as a convenience outlet, an electrical switch, electrical terminals etc. As shown in FIGS. 4-5, the electrical outlet box 28 is connected to one of the openings 12 in the mounting plate and cover 10 by a plurality of fastening means 36. The fastening means 36 may be threaded screws, nuts and bolts or other commonly used fasteners. One fastening means 30 is received in each of the plurality of elongated openings 26 in the mounting plate and cover 10. The mounting plate and cover 10 is adjusted on the electrical outlet box 28 by moving the mounting plate and cover 10 with respect to the elongated openings 26. The fastening means 36 are tightened and the mounting plate and cover 10 is secured to the outlet box 28.

The respective openings 12 in the mounting plate and cover 10 may be dimensioned to receive a single size electrical outlet box 28 or a double size electrical outlet box 28 as required for the specific installation. Also, for telephone outlets and data outlets, which are low voltage, there may not be an electrical outlet box connected to the mounting plate and cover 10, depending upon the electrical code of the community. The mounting plate and cover 10 may have two openings to accommodate two single size boxes, two double size boxes, a single box with a double box, or no box with either a single or a double box.

If required, a second electrical outlet box 28 is connected to the second opening 12 in the mounting plate and cover 10.

Figure 6:
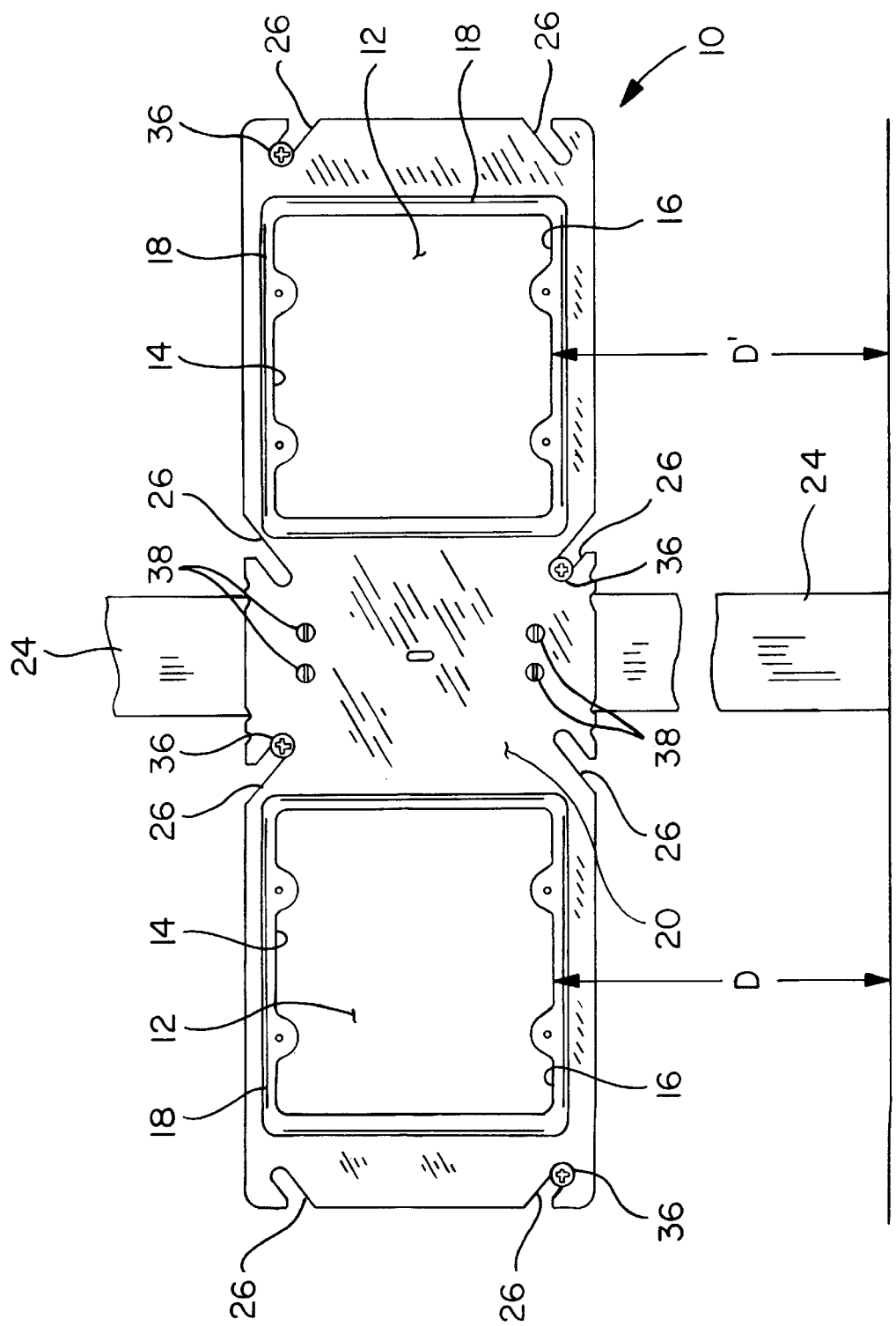
FIG. 6 is a front elevation view of the present invention, with two attached double size electrical boxes, installed on a wall stud a predetermined distance above the floor.
Figure 7:
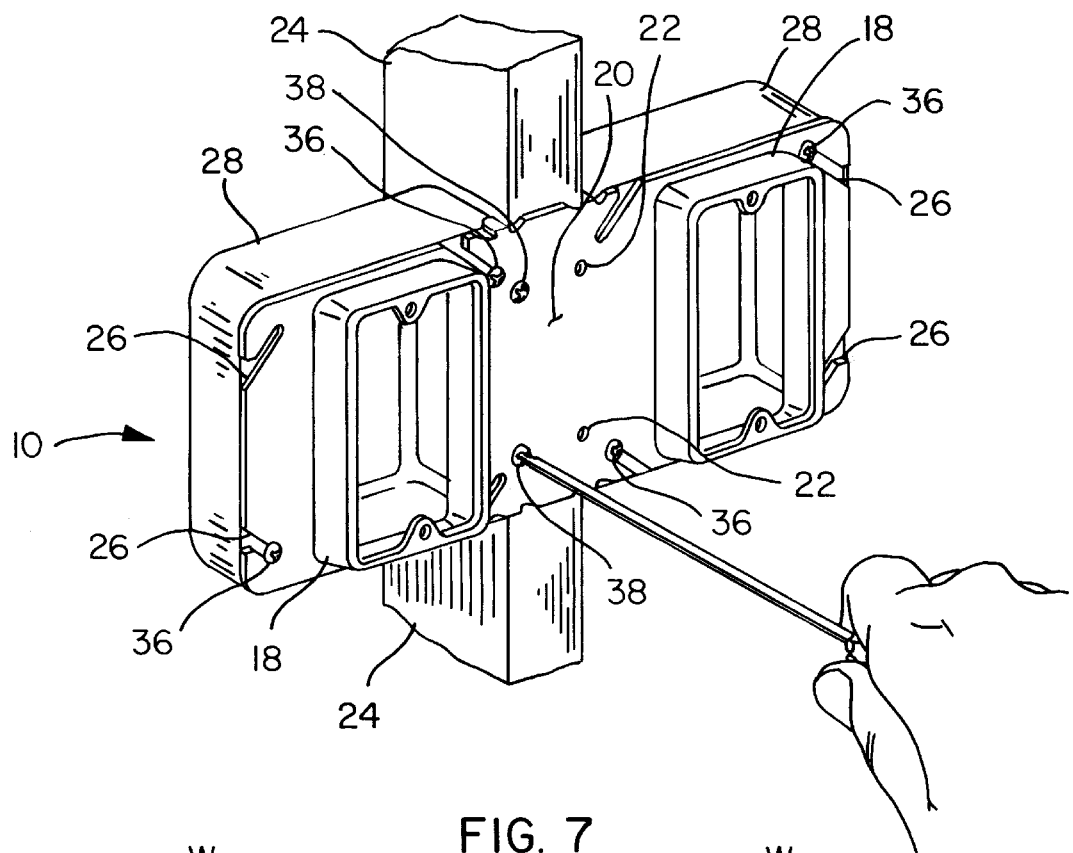
FIG. 7 is a pictorial view of the worker of FIG. 4 installing the mounting plate and cover of the present invention on a wall stud.
Figure 8:
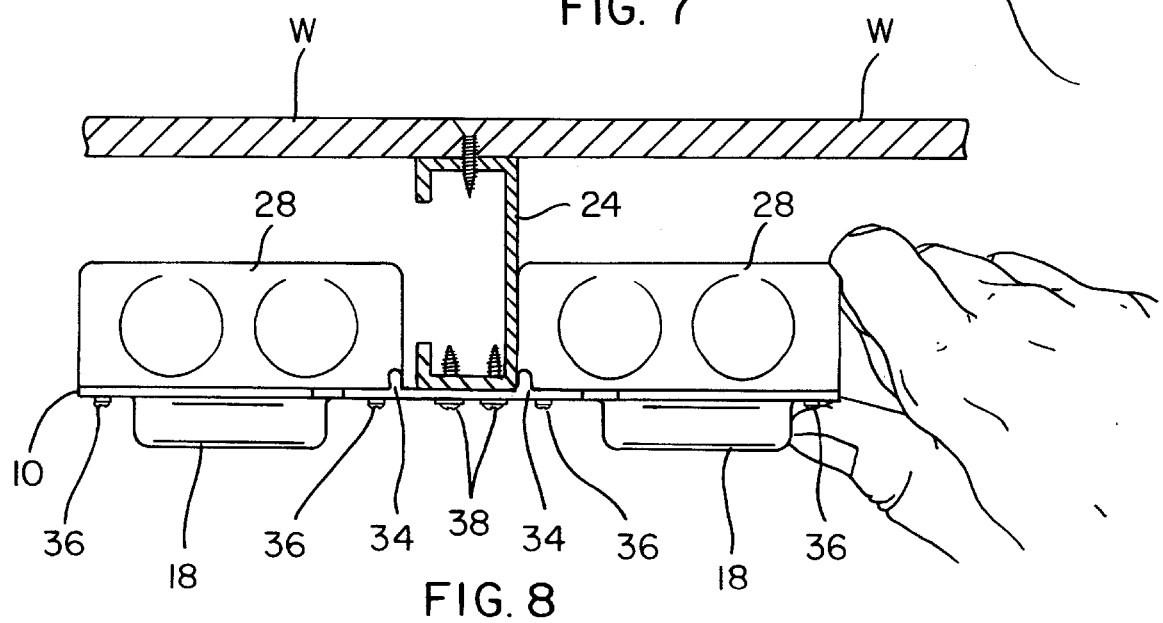
FIG. 8 is a top plan view of the present invention, with two attached electrical boxes, installed in the wall adjacent to one sidewall of a metal wall stud and showing no movement.
Figure 9:
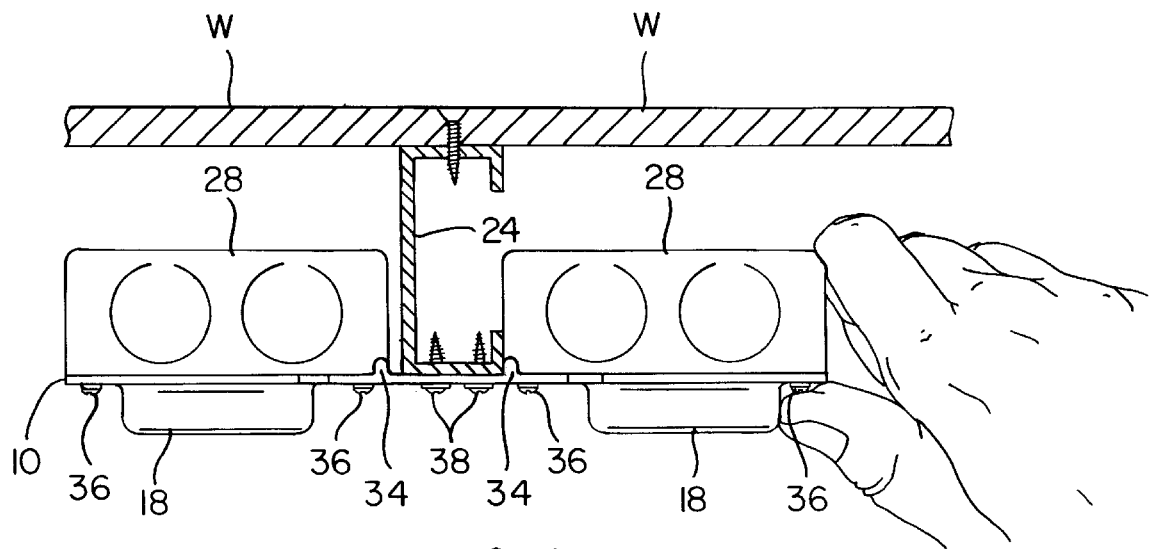
FIG. 9 is a top plan view of the present invention, with two attached electrical boxes, installed in the wall adjacent to the opposite sidewall of a metal wall stud and showing no movement.
Figure 10:
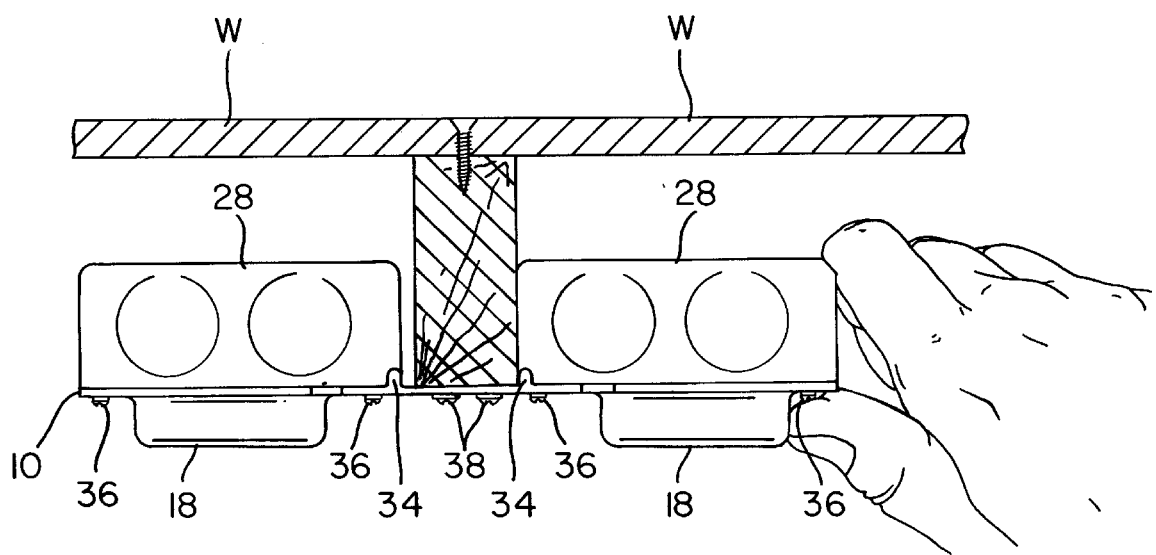
FIG. 10 is a top plan view of the present invention, with two attached electrical boxes, installed in the wall adjacent to a wooden wall stud and showing no movement.
Figure 11:
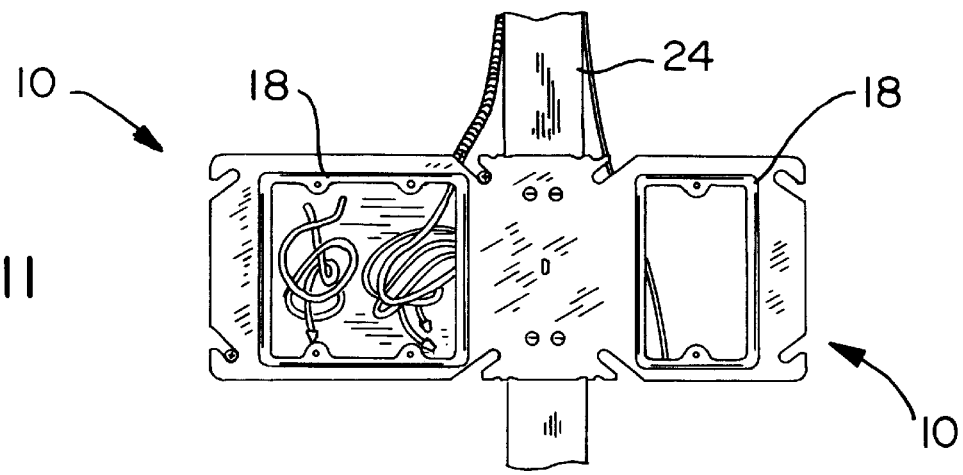
FIG. 11 is a front elevation view of the present invention showing one opening being for a double size electrical box and the other side being for a low voltage installation which does not require an electrical box.
Figure 12:
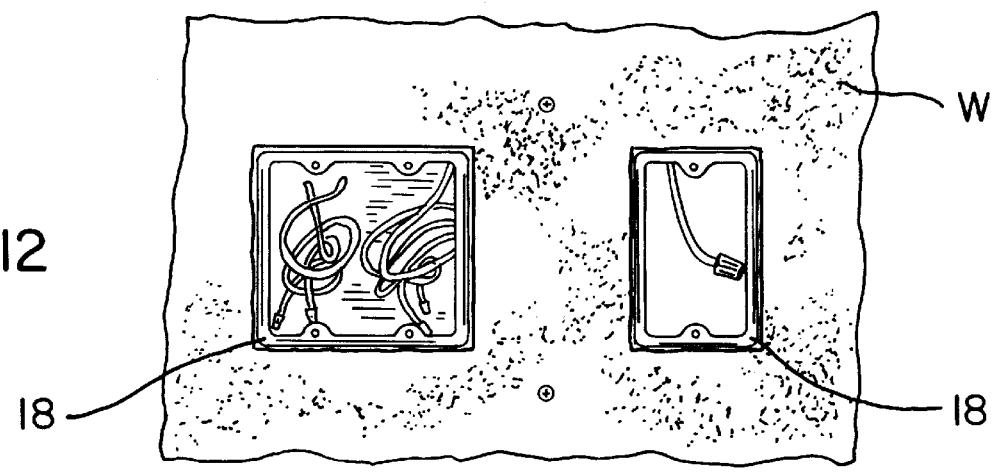
FIG. 12 is the front elevation view of FIG. 11 showing the outlets mounted in the wall.
Figure 13:
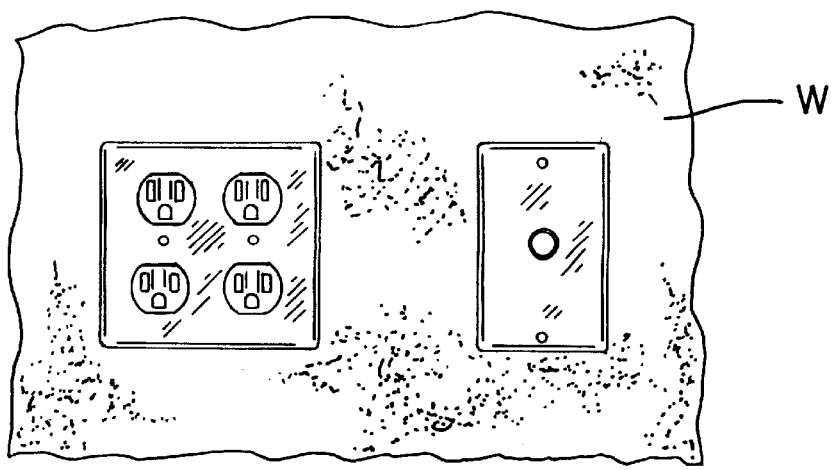
FIG. 13 is the front elevation view of FIG. 12 showing the finished outlets in the wall.

The mounting plate and cover 10 with the attached electrical box(es) 28 is placed adjacent to the wall stud 24 such that one vertical pair of projecting tabs 34 are abutting a sidewall of the wall stud 24. The electrical outlet box 28 is also solidly abutting the sidewall of the wall stud 24. The other vertical pair of projecting tabs 34 and the other electrical box 28 is disposed on the opposite sidewall of the wall stud 24 and are spaced a small distance from the opposite side wall of the wall stud 24. The flange portion 20 is disposed against the front face of the wall stud 24. The mounting plate and cover 10 with the attached electrical box(es) 28 is moved vertically on the wall stud 24 to position the bottom edges 16 of the openings 16 in the cover 10 at a desired distance above the floor of the installation. The projecting tabs 34 and electrical box 28 are maintained in an abutted position against the sidewall of the wall stud 24. In this manner, the bottom edge 16 of both openings are in the same horizontal plane and are an equal distance above the floor as shown in FIG. 6. The distance D is equal to the distance D'. At least two securing means 38 are disposed in the corresponding holes 22 in the flange portion 20 with one securing means 38 being received in each hole 22. The securing means 38 may be any common securing means such as a wood screw or a nail if the wall stud 24 is wood or, if the wall stud 24 is metal, the securing means 38 may be a self-tapping metal screw, a rivet, a nut and bolt, etc. (FIGS. 7–10). Tightening the securing means 38 assures the disposition of the mounting and cover 10 and attached outlet box(es) 28 to the wall stud 24 such that movement in any direction is prevented.

Also formed in the approximate midpoint of the flange portion 20 is a vertical elongated slot 40. The elongated slot is used to visually assist in the placement of the flange portions 20 over the wall stud 24.

The mounting plate and cover 10 electrical box 28 assembly is covered by the wall W such that an opening in the wall W receives the raised rib 18 of the mounting plate and cover 10. The upper surface of the raised rib 18 is substantially flush with the outer surface of the wall W due to the height of the raised rib 18 being approximately the same as the thickness of the wall W. Thus, the electrical fixture within the electrical box 28 is readily accessible to a user (FIGS.

11–13). The electrical output is conveniently mounted in the wall immediately adjacent to the telephone or data outlet so that a computer or data processing apparatus can be operated without having long extension and connecting cables.

In this manner, the electrical box 28 with the electrical fixture therein is firmly mounted between the covering front wall W and a back wall. Movement of the electrical box 28 in any direction is prevented by several factors peculiar to the present invention. The disposition of the electrical box 28 solidly abutting the side wall of the wall stud 24 severely limits any horizontal or angular movement with respect to the wall stud 24. Also the abutting of the projecting tabs 34 further limit movement of mounting plate and cover 20 and the connected electrical box(es) 28. Further, any deflection movement with respect to the wall stud 24 is limited. This limitation of horizontal, angular and deflectional movement is further reinforced by securing the flange portion 20 to the front face of the wall stud 24. In addition, vertical movement with respect to the wall stud 28 is prevented by the securing of the flange portion 20 to the front face of the wall stud 24. Further limitation of movement of the electrical box 28 mounting plate and cover 10 assembly is provided by the covering wall W. In addition, the electrical boxes 28 are in the same horizontal plane and are a predetermined distance above the floor.

Thus, the assembly of the present invention achieves solid installation without the need for a supporting arm between the front wall and the rear wall of a building structure and without the need for an L-shaped bracket to be attached to the stud on the side opposite from the outlet box. In addition, the present invention has only one unitary mounting plate and cover 10 which serves the function of a box support and a raised cover for two adjacent boxes, thereby providing cost efficiency by reducing the number of parts and the labor time to assemble and install as compared to the prior art. The present invention may be rapidly and economically assembled at the job site or it may be preassembled and brought to the job site. The preassembly is possible because there is no need to adjust the length of a far side box support for each electrical box as in the prior art.

Obviously, many modifications may be made without departing from the basic spirit of the present invention. Accordingly, it will be appreciated by those skilled in the art that within the scope of the appended claims, the invention may be practiced other than has been specifically described herein.

I claim:

1. A method of installing a mounting plate and cover for two electrical boxes on a wall stud, the wall stud having a front face and two opposing sidewalls, comprising the steps of:

providing a unitary member having two spaced-apart openings formed therein, the openings each having a bottom edge, the respective bottom edges each being in a same horizontal plane, the unitary member having means therein for securing the unitary member to at least one of the two electrical boxes, the at least one electrical box communicating with at least one of the openings in the unitary member, a planar flange portion being formed between the spaced-apart openings, a plurality of spaced-apart holes being formed in the planar flange portion, fastening the at least one electrical box to the unitary member, disposing the planar flange portion over the front face of the wall stud wherein the at least one electrical box abuts one of the sidewalls of the wall stud and the other of the opening in the unitary member is disposed adjacent to the other of the sidewall of the wall stud, adjusting the at least one electrical box with the unitary member fastened thereto to a desired vertical height on the wall stud, inserting a plurality of securing means into the plurality of spaced-apart holes in the planar flange portion to secure the at least one electrical box to the front face of the wall stud, wherein the at least one electrical box is prevented from undesired movement and the bottom edges of the spaced-apart openings are aligned in the horizontal plane.

2. The method of claim 1, wherein the planar flange portion has a top edge and a bottom edge, at least one projecting tab being formed at the top edge of the planar flange portion on a back surface thereof and at least one projecting tab being formed at the bottom edge of the planar flange portion on the back surface thereof, said projecting tabs being in a same vertical plane, the projecting tabs being oriented approximately perpendicularly to the back surface of the planar flange portion, the unitary member being moved to abut the projecting tabs to one of the sidewalls of the wall stud to facilitate rapid and accurate placement of the unitary member with respect to the wall stud.

3. The method of claim 2, wherein each of the at least one projecting tab is a pair of projecting tabs formed on the top and bottom edges of the planar flange portion, each pair of projecting tabs being spaced—apart by a distance to permit the pair of projecting tabs to straddle the wall stud, disposing the unitary member on the wall stud so that the pair of projecting tabs are straddling the wall stud, aligning the unitary member with the wall stud, and moving the unitary member to the desired vertical height on the wall stud.

4. The method of claim 1, wherein an electrical outlet is provided in one of the spaced-apart openings and a telephone/data connection is provided in the other of the spaced-apart openings such that the electrical outlet and the telephone/data connection are in the same horizontal plane.

5. The method of claim 1, wherein at least one of the spaced-apart openings in the unitary member has a size sufficient to accommodate a double electrical outlet box.

6. A mounting plate and cover for a pair of spaced-apart electrical boxes, the mounting plate being mounted on a front face of a wall stud, the wall stud having two opposing sidewalls, the mounting plate comprising a unitary member having two spaced-apart openings formed therein, the openings each having a respective bottom edge, the bottom edges being in a same horizontal plane, the openings providing access to the spaced-apart electrical boxes, means on the unitary member for fastening thereto at least one of the electrical boxes to at least one of the openings, a planar flange portion formed between the spaced apart openings in the unitary member, a plurality of spaced-apart holes formed in the planar flange portion, a corresponding plurality of securing means being received in the plurality of holes formed in the planar flange portion to secure the mounting plate to the front face of the wall stud, wherein the mounting plate and cover may be securely mounted without undesired movement on the front face of the wall stud with the at least one electrical box juxtapositioned to one of the sidewalls of the wall stud and the bottom edges of the openings in the horizontal plane with respect to the wall stud.

7. The mounting plate and cover of claim 6, wherein the planar flange portion has a top edge and a bottom edge, at least one projecting tab being formed on the top edge of a back surface of the planar flange portion and at least one projecting tab being formed at the bottom edge of the back surface of the planar flange portion, the projecting tabs being in a same vertical plane, the projecting tabs being oriented approximately perpendicularly to the back surface of the planar flange portion, wherein, the projecting tabs serve to align the mounting plate and cover with the one of the sidewalls of the wall stud.

8. The mounting plate and cover of claim 7, wherein each of the at least one projecting tab is a pair of projecting tabs formed on the top and bottom edges of the planar flange portion, the tabs being spaced—apart by a distance to permit the pairs of projecting tabs to straddle the wall stud.

9. The mounting plate and cover of claim 6, wherein at least one of the openings in the unitary member has a size sufficient to accommodate a double electrical outlet box.

* * * * *